United States Patent [19]

Owens

[11] 4,071,888

[45] Jan. 31, 1978

[54] TELEPHONE MULTILINE AUTOMATIC VOICE ANSWER SYSTEM

[75] Inventor: Gerald John Owens, Freehold Township, Monmouth County, N.J.

[73] Assignee: Bell Telephone Laboratories, Incorporated, Murray Hill, N.J.

[21] Appl. No.: 769,166

[22] Filed: Feb. 16, 1977

[51] Int. Cl.² .............................................. G06F 3/04
[52] U.S. Cl. ................................................... 364/200
[58] Field of Search ........... 364/200 MS; 179/15 AQ, 179/15 AT

[56] References Cited

U.S. PATENT DOCUMENTS

| 3,787,818 | 1/1974 | Arnold et al. | 364/200 |
| 3,890,469 | 1/1975 | Kelly et al. | 179/15 AT |
| 3,990,050 | 11/1976 | Kolettis et al. | 364/200 |
| 4,000,487 | 12/1976 | Patterson et al. | 364/200 |
| 4,022,982 | 5/1977 | Hemdal | 179/15 AT |
| 4,025,725 | 5/1977 | Euler | 179/15 AT |

Primary Examiner—Harvey E. Springborn
Attorney, Agent, or Firm—Thomas Stafford

[57] ABSTRACT

A telephone multiline inquiry voice answer system is realized by employing a minicomputer system. Predetermined voice signals are digitally encoded and stand in a disk memory. In response to requests from one or more of the telephone lines the computer central processor determines which digital words are required from the disk to form a desired response message. The digital words are read from the disk to word buffers in dedicated storage stages in one or more storage units in a random access memory. Each storage unit is assigned to a "fixed" number of output lines while each storage stage is assigned to a particular output line. A direct memory access output multiplexer is employed to read the digital words from loaded word buffers in the storage stages to corresponding output lines without substantial processor control. To this end, the multiplexer includes output modules in conjunction with a common control module to effect the desired transfer. Each output module monitors address signals transmitted in the computer system when digital words are transferred from the disk memory to the word buffers in a particular storage unit to detect which ones of the storage stages include buffers that have been loaded with digital words. Then control signals are generated by the multiplexer which are employed to effect reading the digital words from the buffers in a prescribed sequence of read intervals to corresponding requesting lines without programmed intervention of the processor. Efficiency of the multiplexer is enhanced by employing multiple word transfers during each read interval which may vary in number from interval to interval in reading the digital words from loaded ones of the buffers in the random access memory storage stages to the requesting lines in the prescribed sequence of read intervals.

17 Claims, 10 Drawing Figures

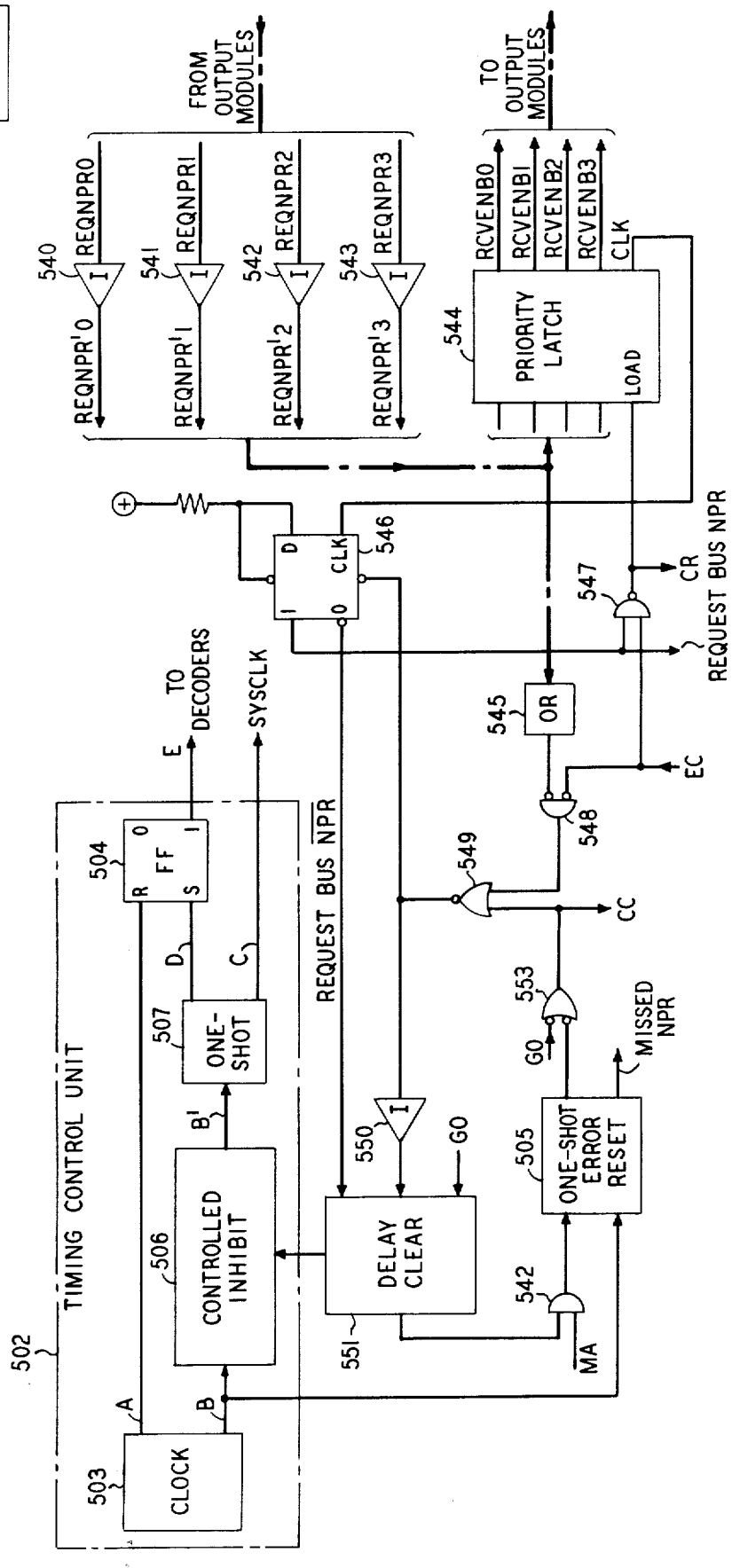

OUTPUT MODULE

TELEPHONE MULTILINE AUTOMATIC VOICE ANSWER SYSTEM

BACKGROUND OF THE INVENTION

This invention relates to an automatic telephone response system and, more particularly, to a telephone inquiry voice response system in which responses are supplied in real time to one ore more inquiring telephone lines or stations.

Numerous inquiry-response systems are known in the art. Typically, they include a storage device at a central location having predetermined response messages stored therein to be transmitted to requesting remote stations or the like. To this end, computers including a mass storage device for storing messages or segments thereof, either in analog or digital form, are employed to respond to inquiries via telephone lines or the like from any of now numerous terminal equipments, for example, telephone station sets, multifrequency signaling units, teletypewriters, et cetera. In prior known systems, the computer is programmed to recognize that an inquiry has been made, determined an appropriate response, concatenate the response from the stored information and transfer the desired information from the mass storage device to the requesting line and, hence, the requesting station or terminal equipment. In some known systems, digital words representing segments of speech are transferred from the mass storage device to an output buffer and then to the requesting lines. Additionally, some systems are arranged to handle requests from a plurality of lines simultaneously. This is achieved by employing input and output multiplexers. In general, the output multiplexers have included buffer storage stages for temporarily storing the analog or digital signals which make up the desired response message to be outputted. For the most part, these prior known systems have employed complex and expensive arrangements for obtaining the desired speech output. Thus, although they may be satisfactory for some applications, they are unattractive for others from a commercial standpoint.

More recently, output multiplexers of the socalled direct memory access type have been advantageously employed to supply response messages in substantially real time to a plurality of requesting telephone lines. One such multiplexer arrangement is disclosed in U.S. Pat. No. 3,990,050 issued to N. J. Kolettis, K. C. O'Brien and G. J. Owens, on Nov. 2, 1976. In this prior direct memory access multiplexer digital words to be outputted are supplied to dedicated buffers, i.e., word locations, in storage stages serially arranged in a single storage unit of a random access memory (RAM) associated with a central processor. The words to be outputted from the buffers in the RAM storage stages are read one at a time in a prescribed sequence of read intervals to corresponding output lines. Since the storages stages are serially aligned in this prior system, expansion to accommodate the addition of lines would require extensive redesign to realize proper timing intervals and the like. Such redesign and resultant rewiring are extremely undesirable. Thus, although the prior direct memory access voice response system may be advantageously employed for applications which do not require substantial growth, it is undesirable for use in systems where rapid and substantial addition of new lines is anticipated.

SUMMARY OF THE INVENTION

These and other problems are resolved in accordance with the inventive principles described herein in an automatic telephone inquiry-voice response system by employing an output multiplexer arrangement that is operative to output digital code words to requesting lines in substantially real time. The inquiry-voice response system includes, in part, a central processor, mass storage unit, memory unit separate from the mass storage unit including a plurality of storage units each having a plurality of serially aligned storage stages and an output multiplexer. Digital words representing predetermined message segments, for example, speech segments, are stored in the mass storage unit which are retrieved and supplied to the memory unit under program control in response to incoming requests. To this end, digital words representing segments of voice response messages are transferred from the mass storage unit into buffers of dedicated storage stages of storage units in the memory unit corresponding to requesting lines. Transfer of the digital words from the buffers in the dedicated storage stages to corresponding requesting lines is initiated and completed under control of the multiplexer without intervention of the central processor. This output transfer is achieved under control of the multiplexer by monitoring system addresses to determine that digital words to be outputted have been supplied to one or more of the dedicated storage stages in one or more of the storage units in the memory unit. Once it has been determined that one or more storage stages in one or more storage units have been loaded with digital words, the multiplexer effects reading of the digital words from the loaded word buffers in the storage stages and supplying them to the requesting lines without processor intervention. Efficiency of the multiplexer is enhanced in one embodiment of the invention by employing a multiple variable word transfer technique in reading the digital words in a prescribed sequence from the loaded buffers in the storage stages of the memory unit to the requesting lines.

Real-time response to requesting lines is achieved by reading out the digital words from the word buffers in the storage stages of the memory unit in a prescribed sequence of read intervals. Specifically, the output multiplexer generates signals for controlling the transfer, i.e., reading of digital words, from buffers in the memory storage units so that digital words in the loaded first word buffers of the first storage stages of the storage units are read out in a prescribed priority sequence during the first read interval of the prescribed sequence of read intervals. Then, the digital words in the loaded first word buffers of the second storage stages in the sequential arrangement of storage stages in each of the storage units are read out in the prescribed priority sequence during the second read interval, and so on through the first word buffers in the last storage stages in the sequential arrangement in each of the storage units. Thereafter, this process proceeds on to the second buffers and then the third and so on to the last buffers of the last storage stages in the sequential arrangement of storage stages in each storage unit. This process is iterated until all responses to requesting lines have been made. Consequently, system efficiency is enhanced by employing multiple word transfers which are variable in number from one read interval to another in a prescribed sequence of read intervals. If word buffers in a particular storage stage in a storage unit have not been loaded a silence code is supplied to the output line corresponding to that storage stage during the intervals that digital words would normally be read from the word buffers.

In one embodiment of the invention a single common control module is employed in conjunction with one or more output modules. The common control module generates timing and control signals which are supplied in part to each output module and a computer system. Each output module, in conjunction with these timing and control signals from the control module, monitors address signals present on the computer bus to detect storage stages that include word buffers that have been loaded corresponding to the outgoing lines assigned to the particular output module, and generates signals for initiating and effecting reading of the digital words from the word buffers in corresponding dedicated storage stages to the corresponding output lines. A prescribed priority sequence arrangement is employed in the common control unit which responds to signals from the output modules to effect multiple word transfers during the read intervals which may vary in number from interval to interval in the prescribed sequence of read intervals during each system cycle. Thus, the number of digital words transferred from the memory unit to corresponding output lines is controllably varied in number from read interval to read interval on command of signals initiated in the individual output modules in conjunction with signals generated in the control module of the multiplexer. This multiple variable word transfer arrangement allows for growth of the system as desired. Consequently, system growth is provided by merely adding more output modules and performing more word transfers during each read interval allowing for substantially real-time response to all lines.

BRIEF DESCRIPTION OF THE DRAWINGS

These and other objects and advantages of the invention will be more fully understood from the following detailed description taken in accordance with the appended drawings in which:

FIGS. 5A and 5B when assembled as shown in FIG. 5 depict details of common control unit 401 of FIG. 4;

DETAILED DESCRIPTION

Figure 1:
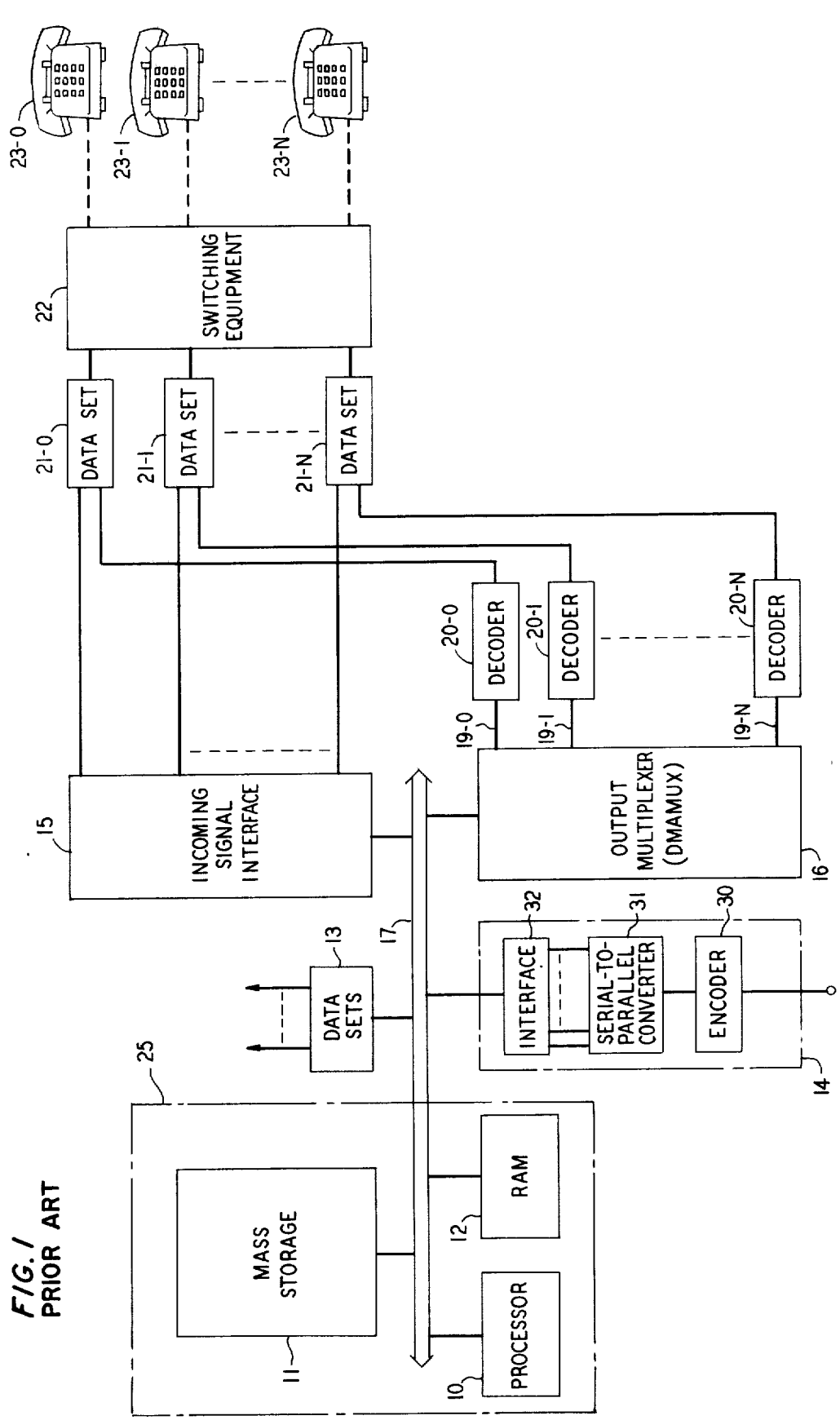
FIG. 1 shows in simplified block diagram form a prior art telephone multiline inquiry voice response system employing an embodiment of the invention.

FIG. 1 shows in simplified block diagram form an automatic telephone voice response system which employs the instant invention. Accordingly, shown are processor 10, mass storage unit 11, random access memory (RAM) 12, data sets 13, data input unit 14, incoming signal interface 15, output multiplexer (DMAMUX) 16, output decoders 20-0 through 20-N, data sets 21-0 through 21-N, switching equipment 22 and input-output devices 23-0 through 23-N. Equipments 10 through 16 are connected in circuit relationship via address, data and control bus 17.

Processor 10, mass storage unit 11, and RAM 12 as interconnected via bus 17 form general purpose computer 25. Computer 25 is employed to store and retrieve from storage digital information as required. Numerous such computer systems are now well known in the art. However, in the practice of this invention it is important that computer system 25 has a particular architecture or otherwise is arranged so that output multiplexer 16 is supplied with at least the addresses accompanying digital signals being supplied from mass storage unit 11 to word buffers in preassigned dedicated storage stages in storage units of RAM 12. Multiplexer 16 monitors first address signals transmitted on bus 17 to determine without programmed computer intervention that word buffers in one or more of the storage stages in one or more of the storage units in RAM 12 have been supplied with digital words to be outputted. Then, multiplexer 16 initiates and controls the transfer of digital words from the buffer stages of RAM 12 by employing, in accordance with an aspect of the invention, multiple word transfers during each read interval which may vary from read interval to read interval in a prescribed sequence of read intervals to effect "real-time" outputs to requesting lines.

In one embodiment of the instant response system, processor 10 is a PDP-11/34 processor unit manufactured by Digital Equipment Corporation. Details of the PDP-11/34 processor and instructions relating to its use are found in a manual entitled PDP-11/34 Processor Handbook, Digital Equipment Corporation, 1976.

Bus 17 is employed to interconnect all of equipments 10 through 16 and to allow communications and transfers of data between the equipments. A typical system architecture employing bus 17 is described in the PDP-11/34 Processor Handbook, cited above, beginning at page 2-1, and PDP-11 Peripherals Handbook, Programming-Interfacing, Digital Equipment Corporation, 1976, beginning at page 5-1.

It is the so-called master-slave capability of the PDP-11 system architecture which is being turned to account in the instant invention. This master-slave operation is described in detail in the PDP-11 Processor Handbook, cited above, beginning at page 2-1 and in the PDP-11 Peripherals Handbook, cited above, beginning at page 5-1.

Mass storage 11 may be any one of the mass storage devices known in the art. It must be of a type capable of or modified to interface with bus 17 and the computer system being employed. Preferably, a disk memory is used, for example, an RJS-03 disk memory manufactured by Digital Equipment Corporation and commercially available. Details of the RJS-03 disk memory, its use and operation may be found in the PDP-11 Peripherals Handbook, cited above, beginning at page 4-414.

Similarly, RAM 12 may be any one of a number of random access memories now well known in the art, provided that it is capable of or modified to interface with bus 17 and other equipments connected thereto. For example, the MM11-DP core memory unit contained in the PDP-11/34 processor unit is satisfactory.

Figure 2:
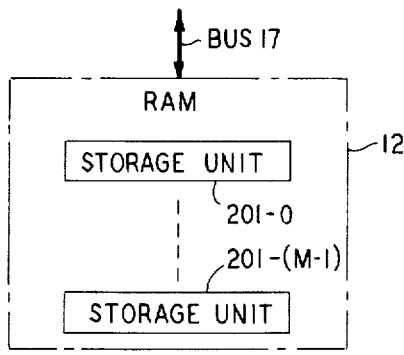
FIG. 2 depicts in simplified block diagram form storage units in random access memory 12.
Figure 3:
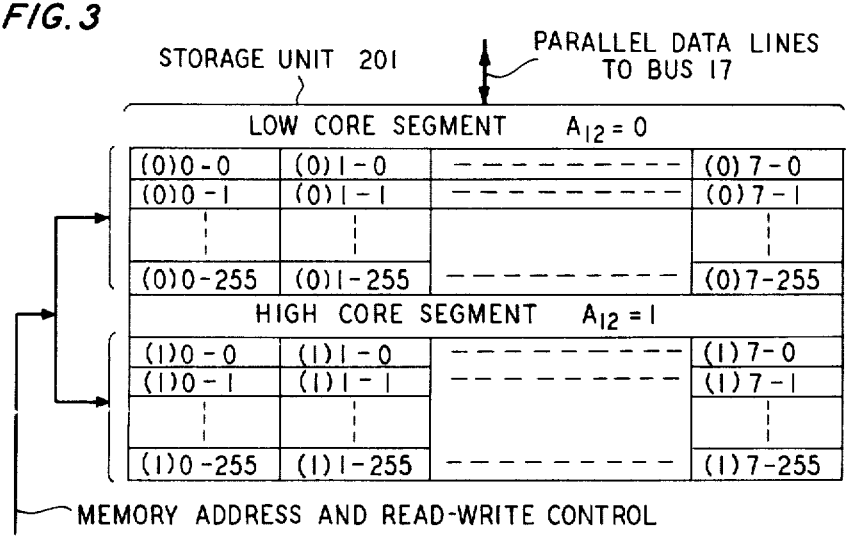
FIG. 3 illustrates in simplified form one of storage units 201 of memory 12.

In this example, a portion of RAM 12 includes a plurality of storage units 201-0 through 201-(M-1), as shown in FIG. 2, each having a predetermined number of storage stages. In one example, each storage unit has two segments each having eight storage stages in a serial arrangement as shown in FIG. 3. Thus, a system having N outgoing lines has M = N/8 storage units in RAM 12. For purposes of illustrating this invention, a 32 line (N = 32, M = 4) system is assumed. Accordingly, RAM 12 includes four dedicated storage units 201 each including two dedicated segments having eight storage stages each, namely, stage 0 through stage 7, as shown in FIG. 3. The storage stages in each unit have similar consecutive addresses, except for the storage unit address bits. In this example, each storage stage has the capability of storing 256 digital data words, as indicated in FIG. 3. The 256 words correspond to a data block representing one-sixth second of a desired message, for example, a segment of speech. The storage unit segments are designated "high" and "low" and are arranged so that word buffers in the storage stages in one of the storage unit segments are being loaded while word buffers in the storage stages in the other storage unit segment are being unloaded. This operation will be further discussed below in relation to output multiplexer 16. Each storage stage in RAM 12 has a designated address and corresponds to a designated output line. Thus, for example, storage stage 0 of both the high and low storage segments of a given storage unit has a preassigned address corresponding to line 0 of a corresponding output module. Each digital word buffer in each of the storage stages also has a preassigned address.

In the PDP-11/34 system, an 18-bit address scheme is employed, namely $A_0$ through $A_{17}$. However, only $A_1$ through $A_{17}$ are employed in the practice of this invention. Briefly, $A_1$ through $A_8$ represent the address of the digital word buffers in each storage stage; $A_9$ through $A_{11}$ represent the addresses of the storage stages and, hence, the incoming and outgoing lines; $A_{12}$ represents the storage unit segment high or low; and $A_{13}$ through $A_{17}$ represent storage units within RAM 12. Use of this address scheme in the practice of the invention is further described below in relation to output multiplexer 16.

Data segments are stored in digital form in mass storage unit 11 which are concatenated under program control via processor 10 and applications programs in RAM 12 to form responses to incoming requests. For purposes of this example, it is assumed that predetermined speech segments are encoded and stored in digital word form in blocks of 256 words in sectors of the disk memory of storage unit 11 in well-known fashion. The digital code words are later retrieved and concatenated into desired responses.

Thus, predetermined voice segments are supplied to data input 14 to be converted into suitable form and supplied via RAM 12 for storage in the disk memory of mass storage unit 11. To this end, data input 14 includes encoder 30, serial-to-parallel converter 31 and interface unit 32 which operate as described in the U.S. Pat. No. 3,990,050.

Data sets 13 are shown for purposes of indicating that the response system disclosed, may, in formulating a proper response in a given application, have need to communicate with other systems or data banks. Data sets 13 are not required for operation of the instant invention and will not be further discussed.

Incoming requests to the instant response system are generated at remote locations, in well-known fashion by employing any one of numerous terminal devices. For example, requests may be made via teletypewriters, dial telephone station sets, multifrequency pads, multifrequency signaling telephone station sets or the like. In this example, multifrequency signaling telephone station sets 23 which employ a standard 4 × 4 code are employed for this purpose. Thus, requests may be initiated from one or more of station sets 23-0 through 23-N by outputting appropriate sequences of multifrequency tones which are employed to connect the requesting line or lines via switching equipment 22 to one or more of data sets 21 and, hence, via incoming signal interface 15 and bus 17 to computer 25. Multifrequency tones are thereafter outputted from station sets 23 to communicate in well-known fashion with computer system 25.

Data sets 21 are employed to convert the standard 4 × 4 multifrequency tones employed in telephone signaling, to two-out-of-eight coded direct current signals. A model 407 type data set manufactured by Western Electric Company may be employed for this purpose.

The two-out-of-eight output from each of data sets 21 is converted into binary form by interface 15 and supplied via bus 17 to computer 25 for further processing as desired. Interface 15 may take on any form capable of converting the two-out-of-eight output from data sets 21 into binary form. Straightforward logic techniques are employed for this purpose. One example of a two-out-of-N binary interface is disclosed in U.S. Pat. No. 3,680,081, issued July 25, 1972.

It should be noted that each equipment connected to bus 17 includes a standard interface for connecting the equipment properly to the bus and for controlling transfer of information from one equipment to another via bus 17. These interfaces are standard equipments and available commercially. See, for example, the PDP-11 Peripherals Handbook, cited above, for details and operation of these interface units.

Output multiplexer 16 is a direct memory access multiplexer (DMAMUX) which is employed to control system timing and to initiate and supply data in the form of digital words from word buffers in dedicated storage stages in one or more storage units in RAM 12 to output decoders 20 and, hence, requesting terminals 23 without substantial intervention of processor 10 and/or program control over the output function. This is achieved by monitoring first address signals transmitted on bus 17 during transfers of digital words from mass storage unit 11 to RAM 12 to determine that buffers in one or more of the dedicated storage stages in one or more storage units of RAM 12 have been supplied with digital words to be outputted to the corresponding requesting lines. Upon detection that one or more of the buffers in one or more storage stages have been loaded, multiplexer 16 generates appropriate "nonprocessor requests" (NPRs) thereby assuming "mastership" of bus 17 and transferring the digital words in a prescribed sequence by employing multiple reads during each read interval which may vary in number from interval to interval in a prescribed sequence of read intervals from the buffers in the RAM storage stages to associated ones of decoders 20 and, hence, the requesting lines.

It is important that the outputs from multiplexer 16 are effected in substantially "real-time". In this example, thirty-two output lines are being serviced. The desired real-time outputs to the output lines are achieved in multiplexer 16 by reading out the digital words from the loaded word buffers in the storage stages of the RAM storage units in a prescribed sequence of read intervals. Specifically, under control of multiplexer 16, digital words in the loaded first word buffers in the first storage stages of the RAM storage units are supplied to corresponding ones of output lines 19 in a prescribed priority sequence during the first read interval of the prescribed sequential order of read intervals. Then, the digital words in the loaded first word buffers of the second storage stages of the RAM storage units in the sequential arrangement of storage stages are read out in the prescribed priority sequence during the second read interval of the prescribed order and so on through the loaded first word buffers in the last storage stages in the sequential arrangement in each of the storage units. Thereafter, this process proceeds on to the second word buffers and then the third, and so on, until digital words from all 256 digital word buffers in the current segment from each storage stage of the storage units having digital words have been outputted. It is noted that the number of storage stages having loaded buffers may vary from interval to interval. This process is iterated until all responses to requesting lines have been made. As indicated above, while the word buffers in stages of, for example, the high segment of each of the RAM storage units are being read, processor 10 is causing the word buffers in the corresponding low segment of each of the RAM storage units to be loaded with the next blocks of 256 digital words to be outputted to the appropriate requesting lines during the next one-sixth second system cycle interval. If particular ones of the output lines are not active, or if a pause between words in a response message is called for, then the corresponding storage stages are not loaded and a silence code is supplied by the multiplexer to the corresponding lines during intervals in which data words would normally be outputted. This output technique allows use of a simplified timing arrangement thereby simplifying the multiplexer design and readily allowing the addition of telephone lines as desired. Consequently, the instant invention has the capability of servicing a greater number of lines (32 in this example as compared to eight in the system of the U.S. Pat. No. 3,990,050)in the same system cycle interval, thereby enhancing efficiency and still maintaining substantially real-time response to all the lines.

It should be recognized that processor 10 is involved to a minor extent in the output function since processor 10 must grant "mastership" of bus 17 to multiplexer 16 on request, and since processor 10 must effect the transfer of data words from mass storage unit 11 to RAM 12. However, the initiation and control of reading of digital words from word buffers in RAM 12 to decoders 20 is effected in accordance with the invention by employing multiple word transfers during each read interval which are variable in number from one read interval to another in the prescribed sequence of read intervals by signals generated in multiplexer 16.

Figure 4:
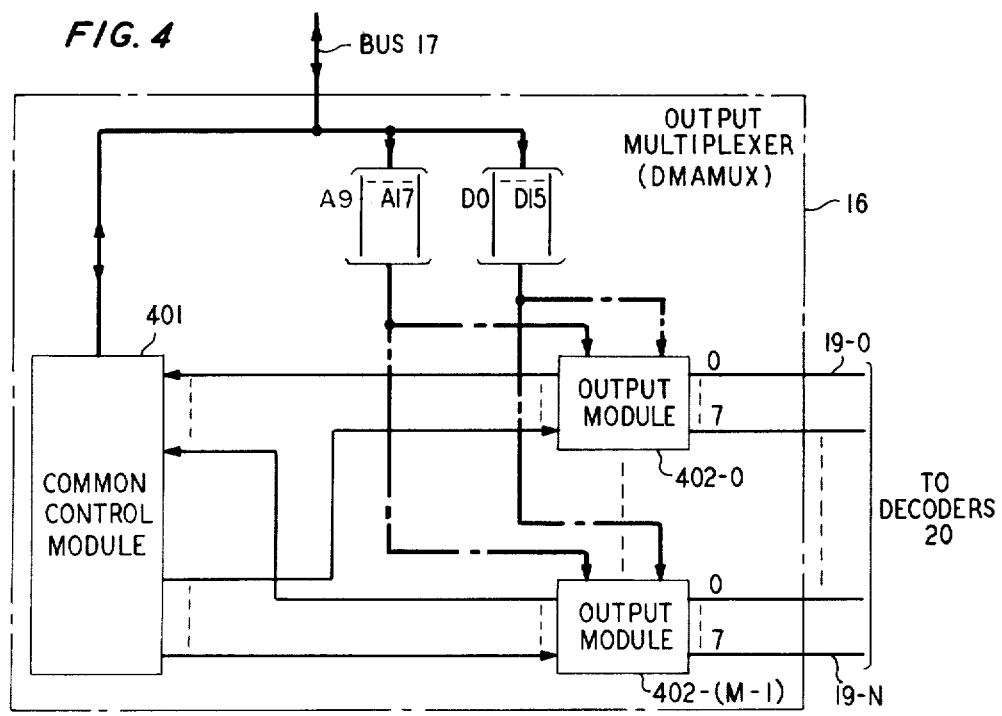
FIG. 4 shows in simplified block diagram form details of multiplexer 16 of FIG. 1.

FIG. 4 shows in simplified block diagram form details of multiplexer 16. Accordingly, shown are common control module 401 and output modules 402-0 through 402-(M-1). Each of output modules 402 is capable of providing outputs to a "fixed" number of lines, in this example, eight. Although each module could be arranged to handle more or less lines, eight appears to be a good engineering compromise for effecting timing and the like. Similarly, the number of output modules 402 employed may be any desired number, again being limited by timing constraints. In this example four modules appears to be a satisfactory number. Output modules 402-0 through 402-3 are ordered from most significant, i.e., 402-0, to least significant, i.e., 402-3.

Common control module 401 interfaces with bus 17 and each of output modules 402 to effect the desired multiple variable word transfers during the read intervals of the prescribed sequence of read intervals. To this end, common control module 401 supplies control signals to each of output modules 402 and receives appropriate control signals from each of modules 402 to initiate desired word transfers. Details of common control module 401 are shown in FIGS. 5A and 5B to be described below.

Figure 6A:
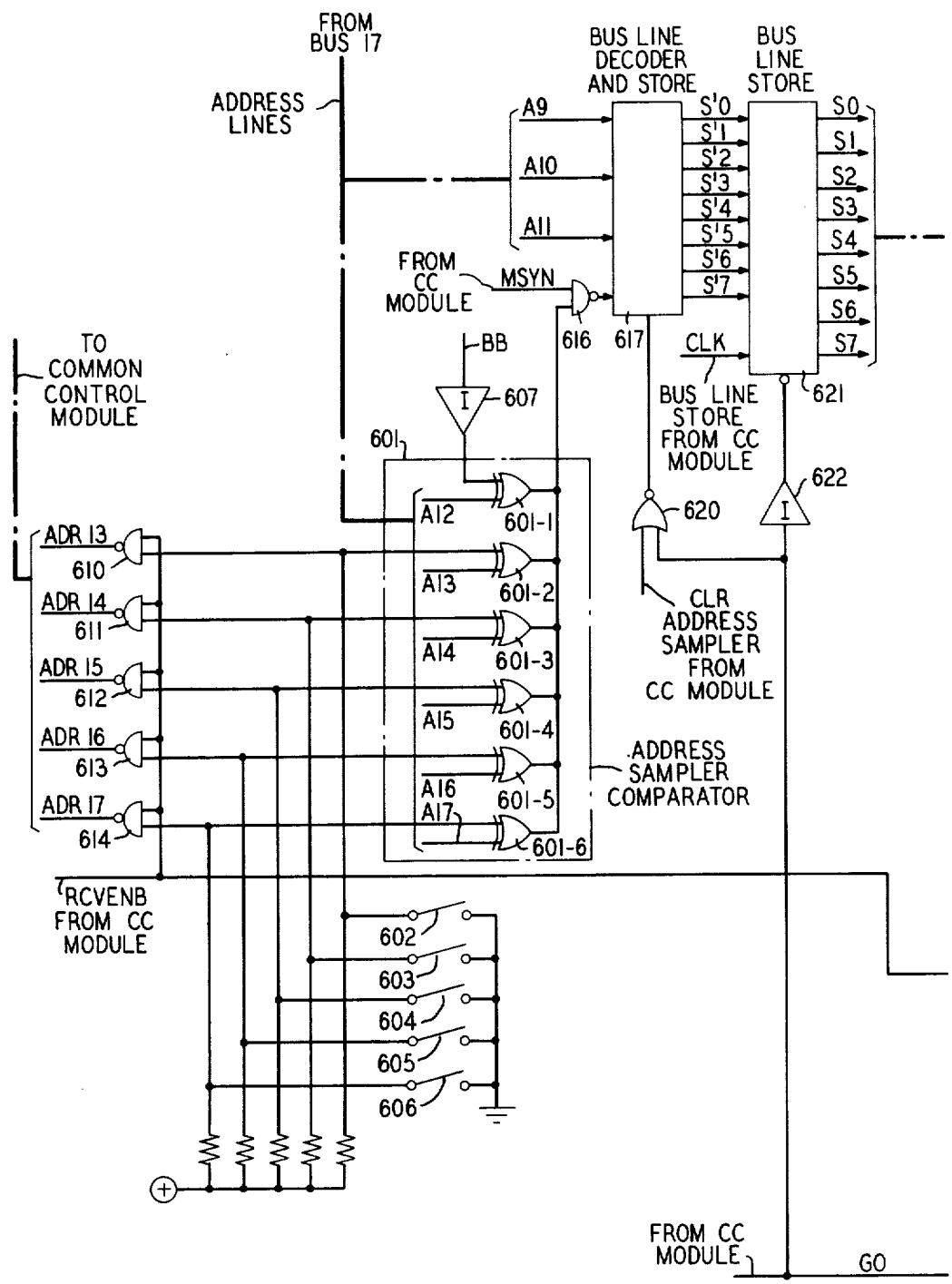
FIGS. 6A and 6B when assembled as shown in FIG. 6 illustrate details of one of output modules 402 of FIG. 4.
Figure 6B:
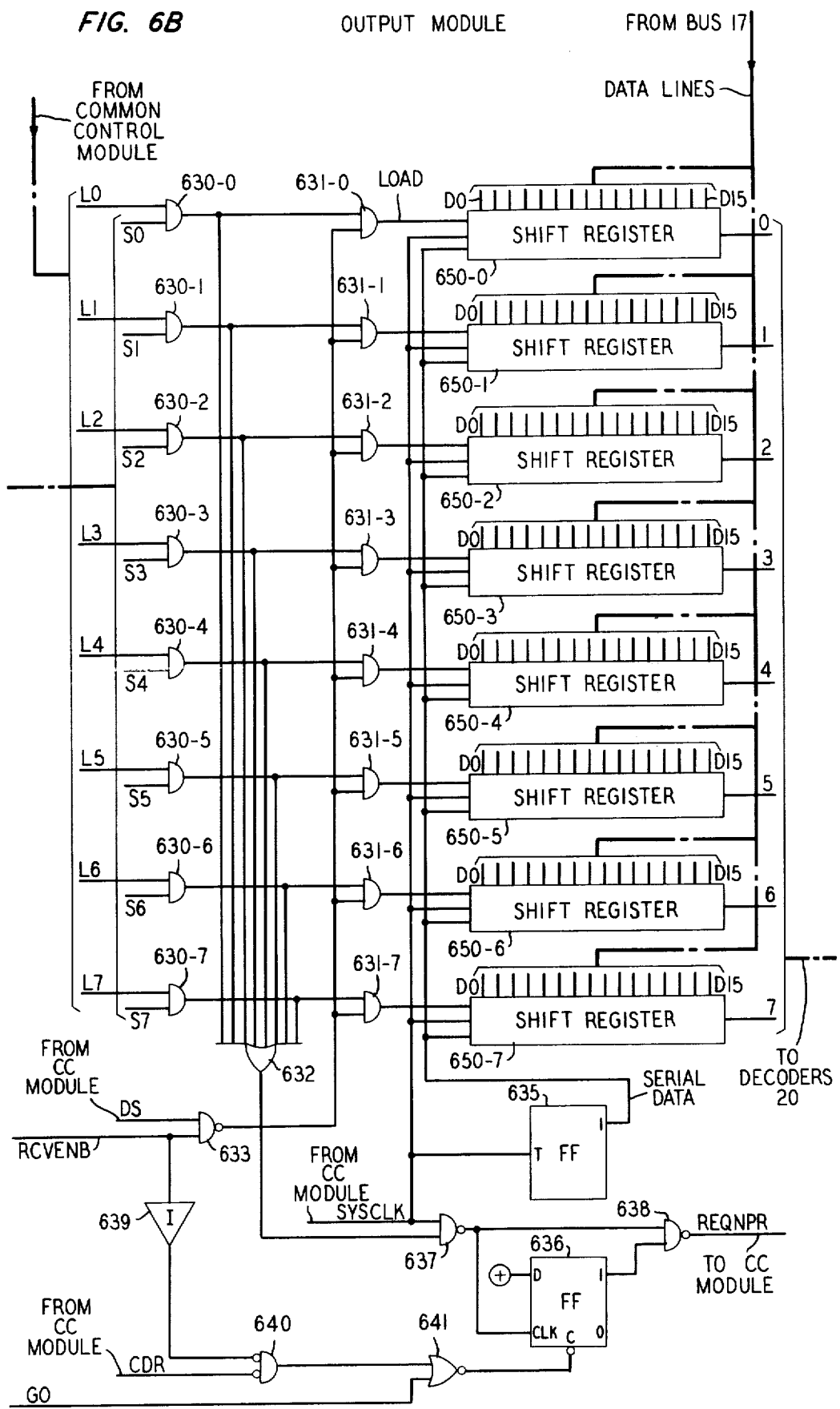

Similarly, each of output modules 402 interfaces with predetermined address lines and data lines of bus 17 and with common control module 401 to supply the bits of the digital words received in parallel via data lines $D_0$ through $D_{15}$ to be outputted in series to decoders 20. Each of modules 402 also monitors address signals appearing on address lines $A_0$ through $A_{17}$ to detect when word buffers in storage stages in a corresponding one of the storage units in RAM 12 have been loaded with digital words to be outputted. Then, each of output modules 402 generates read initiate signals and address signals which are supplied to common control module 401 where control signals are generated to effect reading of the digital words in a prescribed priority sequence to corresponding lines associated with corresponding output modules during each read interval of the prescribed sequence of read intervals in second periodic intervals. Details of output modules 402 are shown in FIGS. 6A and 6B also to be described below.

It is noted that multiplexer 16 initiates and controls the transfer of the digital words from the word buffers in RAM 12 to decoders 20. Reading of the words from the word buffers in RAM 12 is realized by multiplexer 16, specifically common control 401, obtaining control of bus 17. That is, by obtaining "mastership" of bus 17 and then operating RAM 12 as a "slave" unit.

Figure 5A:
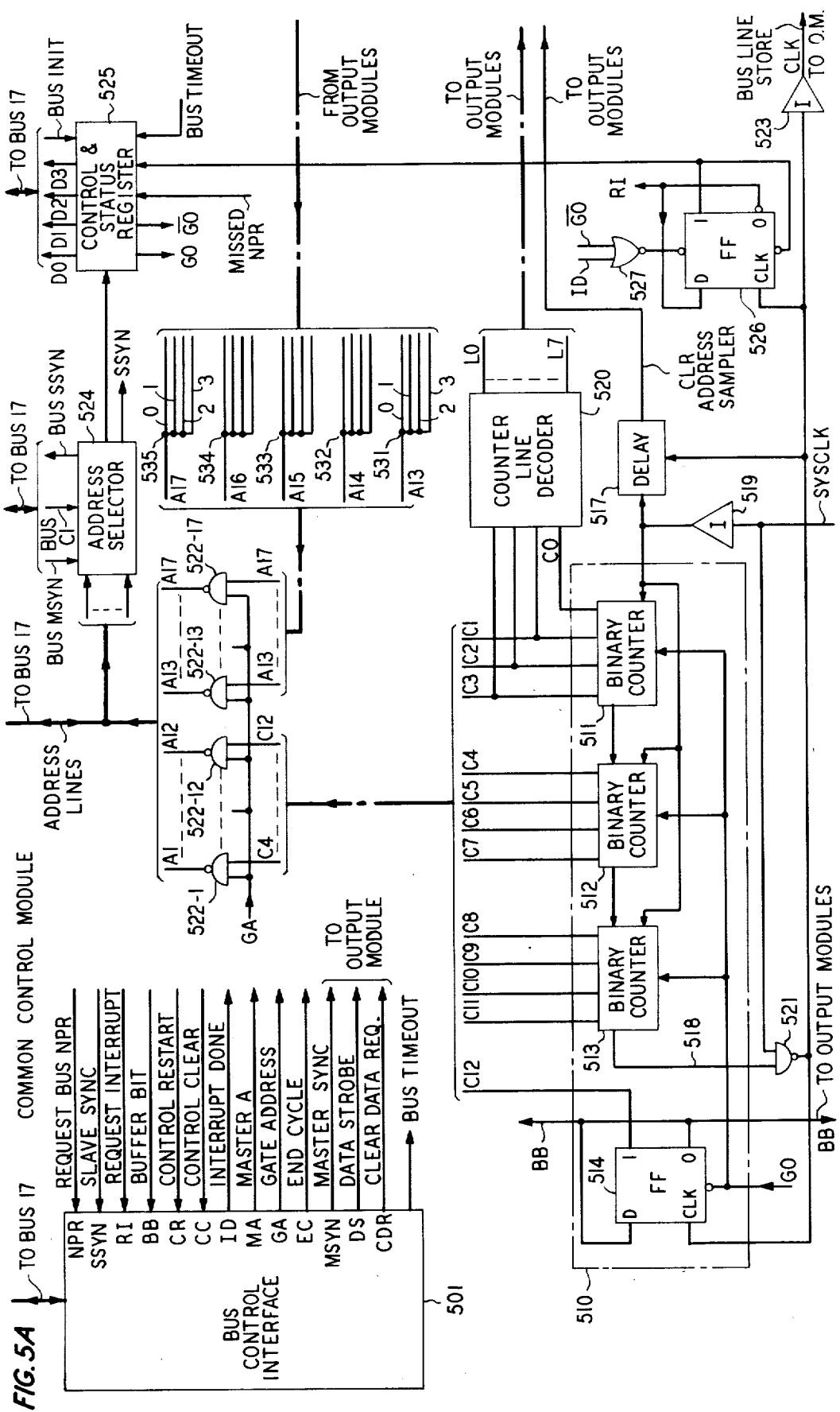

FIGS. 5A and 5B when assembled as shown in FIG. 5 illustrate details of common control 401 of multiplexer 16. In order to generate signals for controlling bus 17 (FIG. 1) and other system functions, bus control interface 501 (FIG. 5A) is employed. Bus control interface 501 responds to signals generated in multiplexer 16, by processor 10 and RAM 12 to generate predetermined control signals, for example, a request interrupt (RI) signal for gaining access to processor 10 and a bus nonprocessor request (NPR) to gain mastership of bus 17. Additionally, a buffer bit (BB) signal generated in multiplexer 16 is supplied via interface 501 to processor 10 to indicate which segment of each RAM storage unit is to be loaded during the next system cycle. Similarly, interface 501 supplies signals used in the operation of multiplexer 16, for example, interrupt done (ID), end of cycle (EC), gate address to bus 17 (GA), data strobe (DS), master sync (MSYN), slave sync (SSYN), clear data request (CDR), master A (MA) and others. These control signals and their functions are described in more detail below in relation to the details and operation of multiplexer 16. Units which may be employed for bus control interface 501 are also manufactured by Digital Equipment Corporation and are commercially available. In one embodiment of the invention an M796 bus master control module and an M7821 interrupt control module are employed. Details and operation of the M796 and M7821 units are described in the PDP-11 Peripherals Handbook, cited above, beginning at pages 6-17 and 6-29, respectively.

Address signals are transmitted to and received from bus 17 via address lines $A_1$ through $A_{17}$. Address lines $A_1$ through $A_{17}$ from bus 17 are bidirectional lines, i.e., incoming and outgoing, and are connected in circuit with an address selector 524 and corresponding ones of the address output gates 522-1 through 522-17. Address selector 524 is responsive to predetermined address signals assigned to multiplexer 16 and to several bus control signals, namely, BUS MSYN and BUS $C_1$ for generating a signal for enabling a priority of gates in control and status register unit 525 and for causing unit 525 to generate GO and $\overline{GO}$ signals. The GO and $\overline{GO}$ signals enable multiplexer 16 for operation by enabling delay clear and a number of flip-flops as indicated on the drawings. Unit 525 includes a plurality of flip-flops (not shown) which store the operational status of multiplexer 16, for example, GO, $\overline{GO}$, missed NPR (from error reset 505), missed IR (from flip-flop 526), and bus time-out (from bus control interface 501). The flip-flops of unit 525 are loaded via an AND gate (not shown) from write and unit selector outputs of address selector 524-1. The output state of all the flip-flops of unit 525 are gated to data lines $D_0$, $D_1$, $D_2$ and $D_3$ via NAND gates (not shown) which are enabled by an AND gate (not shown) supplied with a read output and a unit select output from unit selector 524. A unit which may be employed for address selector 524 is the M105 Address Selector Unit manufactured by Digital Equipment Corporation and described in PDP-11 Peripherals Handbook cited above beginning at page 6-9.

Common control 401 also generates signals for controlling system operation on a periodic interval basis, i.e., a so-called system cycle basis. The system cycle interval corresponds approximately to one-sixth second. To this end, common control 401 includes timing control unit 502 which normally generates a sequence of timing signals. Accordingly, clock 503 generates first pulsating signal A having a first predetermined frequency, for example, 48 kilohertz. The first output from clock 503 is supplied to the reset input (R) of flip-flop 504. Clock 503 also generates second pulsating signal B having a second predetermined frequency, for aexample, 24 kilohertz. Any one of numerous signal generator arrangements may be employed for this purpose. Typically, an oscillator arrangement is employed which generates a square wave signal having a first predetermined frequency. Square wave signals having other desired frequencies are obtained by employing digital dividers. In this example, a toggle flip-flop (not shown), supplied with the 48 kilohertz signal, is employed to generate the 24 kilohertz signal in well-known fashion.

The second pulsating signal output from clock 503, i.e., the 24 kilohertz signal, is supplied to one input of error reset one-shot 505 and to controlled inhibit unit 506. Details and operation of controlled inhibit unit 506 are described below. For purposes of this portion of the description it is assumed that controlled inhibit unit 506 does not inhibit or otherwise delay the second output from clock 503. Consequently, signal B' is substantially identical to signal B and the 24 kilohertz signal is supplied to an input of one-shot 507. The unstable interval of one-shot 507 is set at a predetermined value to obtain pulsating signal C having narrow width pulses, for example, a pulse width of approximately 250 nanoseconds, generated at a 24 kilobit per second rate. This signal C is the system clock signal designated SYSCLK and is supplied to a number of circuit points as indicated on FIGS. 5A, 5B, 6A and 6B. One-shot 507 also generates pulsating signal D which is the complement of the SYSCLK signal. Signal D from one-shot 507 is supplied to the set input of flip-flop 504. Consequently, flip-flop 504 is set and reset to yield signal E at its "1" output having a predetermining one-quarter period three-quarter period duty cycle required to drive decoders 20 (FIG. 1).

As stated above, the digital words to be outputted are supplied to word buffers in storage stages in a plurality of storage units in RAM 12 (FIG. 2). Each storage unit includes two segments of eight sequentially aligned storage stages, namely stages 0 to 7, and each storage stage includes 256 16-bit digital word buffers or locations (FIG. 3). Accordingly, address counter 510 (FIG. 5A), in response to SYSCLK supplied via inverter 519, generates second address signals representative of which segment of the RAM storage units are to be loaded and unloaded during the current system cycle, namely, address bit $A_{12}$ and buffer bit (BB), which storage stages are to be read out, namely, address bits $A_9$, $A_{10}$ and $A_{11}$, and which word buffers in the stages are to be read out, namely, address bits $A_1$ through $A_8$. Address bits $A_{13}$ through $A_{17}$ identify the particular storage unit in RAM 12 which is to be addressed and are supplied from corresponding ones of output modules 402 to be explained below. Counter 510 also generates a signal used to inhibit periodically the outputs from counter line decoder 520, namely, $C_0$, and a so-called carry signal generated at 518 and used to enable NAND gate 521. To this end, counter 510 includes three 4-bit binary counters, 511, 512 and 513 connected in tandem and D-type flip-flop 514.

Carry signal 518 from counter 510 is supplied to enable NAND gate 521 for generating a clock signal in response to the next SYSCLK pulse which is employed to clock flip-flop 514, for enabling delay 517 to activate a fixed delay interval of the SYYCLK pulse yielding CLR address sampler which is supplied to each of output modules 402, to clock flip-flop 526 and to be supplied via inverter 523 to each of output modules 402 to clock each bus line store therein. Operation and details of a circuit which may be employed for delay 517 is described in the U.S. Pat. No. 3,990,050 noted above. Delay 517 delays carry output 518 so that the CLR address sampler signal is generated after the CLK bus line store signal in response to SYSCLK supplied via inverter 519.

Flip-flip 526 when clocked by the output from NAND gate 521 initiates generation of an interrupt request (IR) in bus control interface 501. The interrupt request informs processor 10 (FIG. 1) that additional code words, if any, may be supplied to the unloaded buffers in a segment of each of the RAM units identified by $C_{12}$ which are to be outputted during the next system cycle interval. Flip-flop 526 is initialized via GO and reinitialized via ID (interrupt done) both supplied via NOR gate 527.

Table I shows, in part, the logical signal representations of the outputs from address counter 510 and their corresponding RAM storage stage addresses. It is noted that the storage stage address generated by counter 510 changes in response to every other SYSCLK pulse. The reason for this will be explained below in relation to output registers 650 employed in output modules 402.

TABLE I

| Address Counter Outputs | | | | | | | | | | | | |
|---|---|---|---|---|---|---|---|---|---|---|---|---|
| $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |

TABLE I-continued

| $A_{12}$ | $A_8$ | $A_7$ | $A_6$ | $A_5$ | $A_4$ | $A_3$ | $A_2$ | $A_1$ | $A_{11}$ | $A_{10}$ | $A_9$ | — |
|---|---|---|---|---|---|---|---|---|---|---|---|---|
| | | | | Storage Stage Buffer Addresses | | | | | | | | |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 1 | 0 | 1 |
| 0 | 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 1 | 1 | 1 |
| 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 1 | 0 | 0 | 1 |
| 0 | 0 | 0 | 0 | 0 | 0 | 0 | 0 | 0 | 1 | 0 | 1 | 0 |
| 0 | 0 | 0 | 0 | 0 | 0 | 0 | 0 | 0 | 1 | 0 | 1 | 1 |
| 0 | 0 | 0 | 0 | 0 | 0 | 0 | 0 | 0 | 1 | 1 | 0 | 0 |
| 0 | 0 | 0 | 0 | 0 | 0 | 0 | 0 | 0 | 1 | 1 | 0 | 1 |
| 0 | 0 | 0 | 0 | 0 | 0 | 0 | 0 | 0 | 1 | 1 | 1 | 0 |
| 0 | 0 | 0 | 0 | 0 | 0 | 0 | 0 | 0 | 1 | 1 | 1 | 1 |
| 0 | 0 | 0 | 0 | 0 | 0 | 0 | 0 | 1 | 0 | 0 | 0 | 0 |
| ⋮ | ⋮ | ⋮ | ⋮ | ⋮ | ⋮ | ⋮ | ⋮ | ⋮ | ⋮ | ⋮ | ⋮ | ⋮ |
| 0 | 1 | 1 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 1 | 0 |

From Table I it is seen that counter 510 generates a predetermined sequence of signals representative of the word buffer addresses in the storage stages of RAM 12 so that the digital words stored in the word buffers of the storage stages are controllable read out in a prescribed sequence of read intervals. As indicated in Table I, the read interval sequence of the digital words from buffers in RAM 12 is to read out from one of the segments of each storage unit, for example the low segment identified by $A_{12} = 0$, of the memory units having loaded word buffers in the storage stages, the first digital word from the first word buffers identified by $A_1$ through $A_8$ in the storage stage of each storage unit identified by $A_9$, $A_{10}$ and $A_{11}$ beginning with storage stage 0 through storage stage 7 in a sequential order of read intervals. Note that the memory unit addresses $A_{13}$ through $A_{17}$ are supplied from the corresponding output units and are employed in the control module in a prescribed priority sequence only for those output modules corresponding to loaded buffers during each read interval. The number of such modules corresponding to storage stages having loaded buffers may vary from read interval to read interval. Then, counter 510 generates signals representative of the addresses of the second buffers of storage stages 0 through 7 in sequential order and so on through the 256th buffers of the low segments of each storage unit. In response to the next SYSCLK pulse after the address for the 256th word buffer of storage stage 7 have been generated, stage $C_{12}$ of counter 510 changes state to indicate that the digital words are to be read out of the buffers of the storage stages of the second segment of each storage unit, namely the high segment identified by $A_{12} = 1$. Counter 510 continuously generates this predetermined sequence of addresses and thereby controls system timing for the transfer of data words from RAM 12 to decoders 20 and, hence, requesting lines.

Counter 510 output $C_{12}$ is also designated the buffer bit (BB) is supplied to bus control interface 501 and to each of output modules 402. Outputs $C_0$, $C_1$, $C_2$ and $C_3$ from counter 510 are connected in circuit with inputs of counter line decoder 520. Outputs $C_1$ through $C_{12}$ of counter 510 are connected in predetermined one-to-one circuit relationship with inputs of address output NAND gates 522-1 through 522-12, as shown in Table I. Address signals $A_{13}$ through $A_{17}$ are supplied from each of output modules 402 and are OR'ed at circuit points 531 through 535, respectively. In turn, they are supplied to address output NAND gates 522-13 through 522-17, respectively, in a prescribed priority sequence during each read interval. That is to say, address signals $A_{13}$ through $A_{17}$ are sequentially changed during each output read interval of address counter 510. Only those addresses of memory units having loaded buffers to be outputted during the read interval are supplied from corresponding ones of modules 402, thus realizing the desired multiple word transfers which may vary in number from read interval to read interval, i.e., variable multiple transfers.

Counter line decoder 520 responds to the signals supplied from outputs $C_0$, $C_1$, $C_2$ and $C_3$ of counter 510 to generate signals in sequential order during each of second periodic intervals representative of read intervals, i.e., the storage stages 0 through 7, of each of the storage units in RAM 12 that counter 510 is currently generating an address for. The output from decoder 520 changes in sequence every other SYSCLK pulse. That is to say, outputs $L_0$ through $L_7$ are sequentially true only for the interval between SYSCLK pulses but change in sequence every other SYSCLK pulse. This is realized by output $C_0$ from counter 510 inhibiting the appearance of signals at the outputs of decoder 520 during the interval between every other SYSCLK pulse. This sequence is important so that the corresponding one of output registers 650 in each of output modules 402 is loaded with a data word from the storage stage assigned to the specific one of the output registers in each of output modules 402.

Turning briefly to FIG. 6B, output registers 650-0 through 650-7 in each of the output modules are assigned in one-to-one relationship to storage stages 0 through 7 of an individual one of the storage units in RAM 12. Inhibiting the outputs of decoder 520 (FIG. 5A) with every other SYSCLK pulse via the $C_0$ output of counter 510 is related to the number N, of lines being serviced by each output module, in this example, N=8, and the number of bits in the data word, in this example, 16. Additionally, it is important that there is no output from decoder 520 when $C_0$ is in a high or true state. This insures that individual ones of registers 650 are not enabled for loading during such intervals. Otherwise, clocking of registers 650 would be in error. Since each of registers 650 must output 16 bits before it can be loaded with another 16-bit word and since eight lines may be loaded in sequential order in each output module, it follows that the loading control signal ($L_0 - L_7$) can advance only on every other SYSCLK pulse. This procedure allows 16 bits to be shifted out of each one of registers 650 before the loading control signal is again supplied to them.

The sequence of output signals generated at outputs $L_0$ through $L_7$ of decoder 520 in response to outputs $C_0$ through $C_3$ from counter 510 during periodic 16 SYSCLK intervals is shown in Table II.

TABLE II

| Address Counter Outputs | | | | Counter Line Decoder Outputs | | | | | | | |
|---|---|---|---|---|---|---|---|---|---|---|---|
| $C_3$ | $C_2$ | $C_1$ | $C_0$ | $L_7$ | $L_6$ | $L_5$ | $L_4$ | $L_3$ | $L_2$ | $L_1$ | $L_0$ |
| 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 |
| 0 | 0 | 1 | 0 | 0 | 0 | 0 | 0 | 0 | 0 | 1 | 0 |
| 0 | 0 | 1 | 1 | 0 | 0 | 0 | 0 | 0 | 0 | 0 | 0 |
| 0 | 1 | 0 | 0 | 0 | 0 | 0 | 0 | 0 | 1 | 0 | 0 |
| 0 | 1 | 0 | 1 | 0 | 0 | 0 | 0 | 0 | 0 | 0 | 0 |
| 0 | 1 | 1 | 0 | 0 | 0 | 0 | 0 | 1 | 0 | 0 | 0 |
| 0 | 1 | 1 | 1 | 0 | 0 | 0 | 0 | 0 | 0 | 0 | 0 |

TABLE II-continued

| Address Counter Outputs | | | Counter Line Decoder Outputs | | | | | | | |
|---|---|---|---|---|---|---|---|---|---|---|
| 1 | 0 | 0 | 0 | 0 | 0 | 1 | 0 | 0 | 0 | 0 |
| 1 | 0 | 0 | 1 | 0 | 0 | 0 | 0 | 0 | 0 | 0 |
| 1 | 0 | 1 | 0 | 0 | 0 | 1 | 0 | 0 | 0 | 0 |
| 1 | 0 | 1 | 1 | 0 | 0 | 0 | 0 | 0 | 0 | 0 |
| 1 | 1 | 0 | 0 | 0 | 1 | 0 | 0 | 0 | 0 | 0 |
| 1 | 1 | 0 | 1 | 0 | 0 | 0 | 0 | 0 | 0 | 0 |
| 1 | 1 | 1 | 0 | 1 | 0 | 0 | 0 | 0 | 0 | 0 |
| 1 | 1 | 1 | 1 | 0 | 0 | 0 | 0 | 0 | 0 | 0 |

The sequence of signals shown in Table II is iterated continuously. Thus, control unit 401 of multiplexer 16 is continuously generating signals which are supplied to each of output modules 402 to scan signals stored therein representative of storage stages in a storage unit in RAM 12 assigned to the output module and will be described further below.

Each of output modules 402 responds in a manner to be described below to counter line decoder 520 outputs $L_0$ through $L_7$ and other control signals to generate non-processor requests (NPRs) during each read interval that a word buffer in a corresponding memory unit is to be read. The read intervals are defined by a true output on one of outputs $L_0$ through $L_7$ for a duration equal to the interval between SYSCLK pulses and every other SYSCLK interval (see $L_0$ FIG. 7). During each such read interval in a system cycle, none, one, or more buffers may be loaded with data words to be outputted depending on the active lines associated with the output modules. Additionally, the number of words to be read during each read interval may vary from interval to interval.

Accordingly, a number of digital words may be read during each read interval which may vary in number from interval to interval during the prescribed sequence of read intervals in a system cycle interval. To this end, a request for a nonprocessor request (REQNPR) is supplied from each of output modules 402 which has an active line or lines corresponding to the storage stage or stages in a corresponding storage unit having loaded word buffers to be outputted. In this example, REQNPR from modules 402-0 through 402-(M-1), (M=4 in this example) are supplied via inverters 540, 541, 542 and 543, respectively, (FIG. 5B) representative of active lines to inputs of priority latch circuit 544 and OR gate 545 during each read interval. In this example, there may be none, one, two, three or four REQNPRs during each read interval and the number of REQNPRs may vary from one interval to another.

Figure 7:
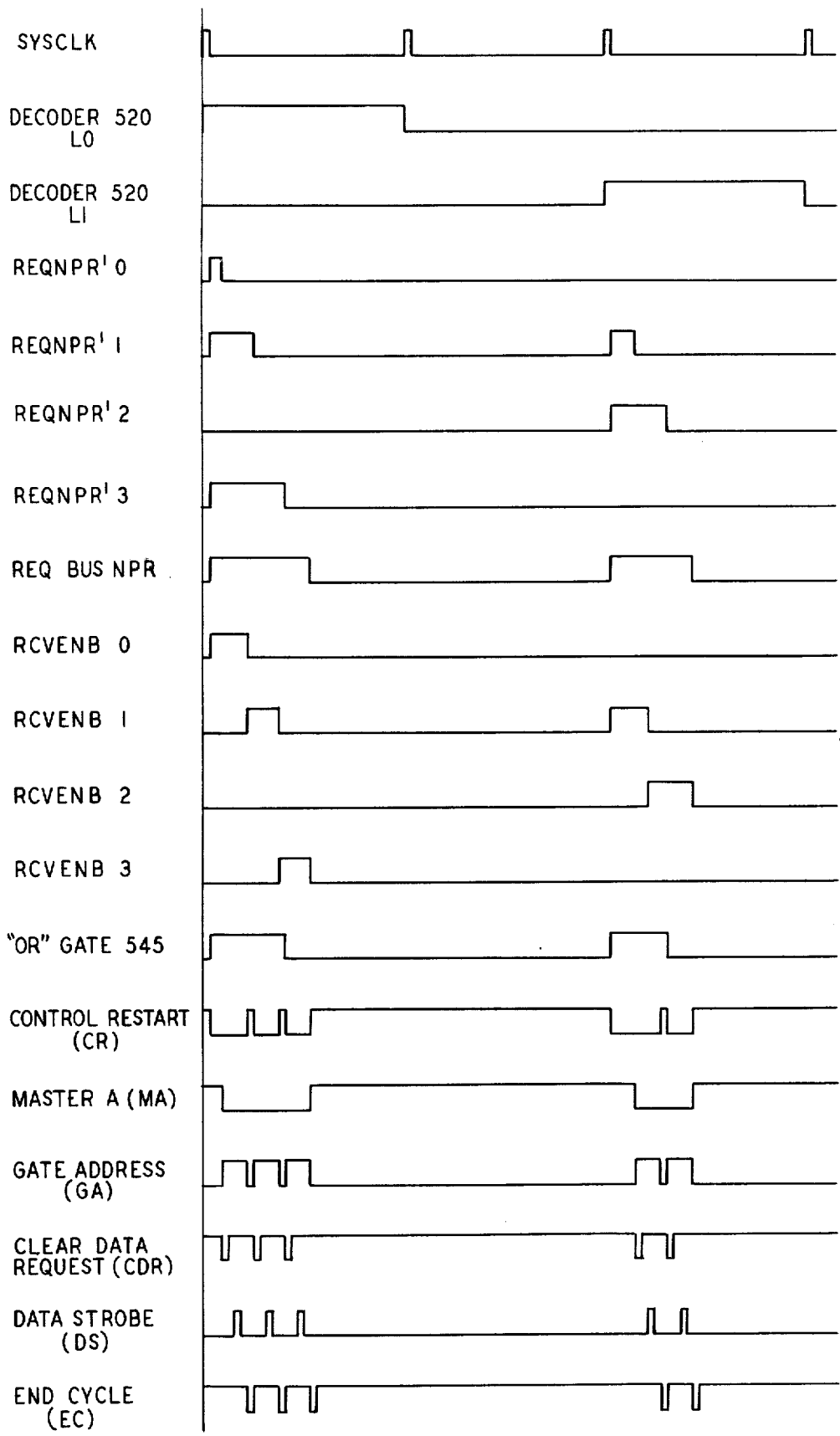
FIG. 7 depicts a sequence of waveforms useful in describing operation of multiplexer 16.

FIG. 7 depicts a sequence of waveforms useful in describing the operation of the multiple variable read process. Accordingly, by way of example, shown are read intervals $L_0$ and $L_1$ during which REQNPR 0, REQNPR 1 and REQNPR 3, and REQNPR 1 and REQNPR 2, respectively, are present. The requested number of REQNPRs is effected, in part, during each read interval by the operation of priority latch circuit 544 (FIG. 5B) in conjunction with flip-flop 546, NAND gate 547, gate 548, control signal end cycle (EC), control signal control restart (CR), and control interface 501. Gate 548 is an AND gate with inhibit inputs, one of which is inhibited by a true output from OR gate 545 until all REQNPRs are completed during a particular read interval. Thus, if any output module generates a REQNPR the corresponding true output from one of inverters 540 through 543 and, hence, OR gate 545, causes gate 548 to be inhibited. In this example, during read interval $L_0$(FIG. 7) which is, for example, approximately 41⅔ microseconds, REQNPRs 0, 1 and 3 are present. Consequently, inverters 540, 541 and 543 yield true outputs as shown by waveforms REQNPR'0, REQNPR'1 and REQNPR'3 (FIG. 7) while inverter 542 yields a false output as shown by waveform REQNPR'2. These signals from inverters 540 through 543 are supplied to corresponding inputs of priority latch circuit 544 and OR gate 545. Consequently, gate 548 is inhibited. Priority latch 544 responds to the REQNPR'0 input, i.e., the most significant read initiation signal, to yield true outputs on RCVENB 0 and CLK, immediately. RCVENB 0 is supplied to output module 402-0 to effect supplying of address signals $A_{13}$ through $A_{17}$ generated in output module 402-0 to address output NAND gates 522-13 through 522-17, respectively, and to initiate the extinguishing of the REQNPR 0 in a manner to be described below. The CLK output from latch 544 is supplied to the CLK input of D-type flip-flop 546 causing flip-flop 546 to yield a true signal on output 1. This output from flip-flop 546 is designated request bus NPR and is supplied to control interface 501 and also to one input of NAND gate 547. The output from gate 547 goes false thereby causing latch 544 to be loaded with the REQNPR' inputs. Flip-flop 546 will remain in this state, i.e., true "1" output, until all REQNPRs from output modules 402 have been effected during a read interval or the read interval has been aborted. The request bus NPR output from flip-flop 546 causes control interface 501 to generate a sequence of control signals to gain mastership of bus 17 and cause RAM 12 to be a slave unit. Specifically, in the process of control interface 501 and, hence, multiplexer 16 obtaining mastership of bus 17 in response to the request bus NPR, a so-called master A (MA) signal is generated in control 501 as shown in the corresponding waveform of FIG. 7. This initial MA signal initiates the generation of bus control signals in interface 501 including gate address to bus (GA), master sync wait (not shown), master sync (MSYN), data wait (not shown), clear data request (CDR), date strobe (DS) and end cycle (EC). Upon generating MSYN the control interface 501 must first receive a so-called slave sync (SSYN) signal from the desired slave unit, i.e., RAM 12, prior to generating the data wait, data strobe and end cycle control signals. These control functions and generation of the various control signals are described in detail in the PDP-11 Peripherals Handbook paragraphs 5.5 and 5.6. Additionally, the relative timing of the control signals for outgoing data signals and incoming data signals is further illustrated in FIGS. 5-9 and 5-11, respectively, of the Peripherals Handbook.

Each REQNPR is indicative that a data word is needed from a word buffer in a storage stage identified by the address presently being generated by address counter 510 in a storage unit identified by the address signals $A_{13}$ through $A_{17}$ being supplied by the particular output module, in this example module 402-0. It should be noted that the address signals $A_1$ through $A_{12}$ being generated by counter 510 are present for the entire duration of read interval $L_0$. Thus, once mastership of bus 17 is obtained, as indicated by master A going false, the gate address (GA) signal is generated to gate address signals $A_1$ through $A_{17}$ via NAND gates 522 to RAM 12 to obtain the digital word in the word buffer in the storage stage of the storage unit identified by those address signals and to supply that digital word to register 650-0 of output module 402-0. The clear data request (CDR) signal is supplied to output modules 402 and employed in conjunction with RCVENB 0 in module 402-0 to extinguish REQNPR 0 in a manner to be described below. Then, the data strobe signal (DS) is supplied to the output modules 402 to effect loading in module 402-0 of the requested digital word into register 650-0. Since module 402-0 is the only module enabled via RCVENB 0 the data word is loaded only in register 650-0 in module 402-0. The end cycle (EC) signal is supplied to a second input of gate 548 and to a second input of NAND gate 547. Since gate 548 is inhibited via the output from OR gate 545 the end cycle signal has no effect. However, the end cycle signal causes NAND gate 547 to be inhibited yielding a true control restart (CR) signal which is supplied to the load input of latch 544 and to control interface 501. Latch 544 responds to this true output to update its outputs. That is to say, latch 544 updates itself to the next true input in the priority sequence, in this example REQNPR'1, which yields a true RCVENB 1 signal. Thus, the next most significant receive enable signal is generated in the priority sequence. All other RCVENB outputs are false. RCVENB 1 is supplied to output module 402-1 to be utilized as described above for module 402-0. Control restart (CR) causes control interface 501 to regenerate the bus control signals to effect reading a digital word from the word buffer and storage stage identified by the output from counter 510 in the storage unit identified by address signals $A_{13}$ through $A_{17}$ supplied from output module 402-1 in response to RCVENB 1. Thereafter, the gate address (GA), clear data request (CDR), data strobe (DS), and end cycle (EC) signals are generated in a manner described above, as well as control restart (CR). Latch 544 again responds to control restart (CR) to update its outputs to the next true input, in this example REQNPR'3. REQNPR'2 is skipped because the corresponding input to latch 544 was false. Again, control signals are generated to effect reading of the corresponding digital word to the corresponding output stage. However, in response to clear data request (CDR) the last request for REQNPR is extinguished yielding all false outputs from inverters 540 through 543 and, hence, OR gate 545, thereby enabling gate 548. Gate 548, in response to the end cycle (EC) signal yields a true output which is inverted and supplied via NOR gate 549 to the clear input of flip-flop 546. The output from NOR gate 549 is also supplied via inverter 550 to delay clear 551. The false output from NOR gate 549 clears flip-flop 546 and enables delay clear 551. Clearing of flip-flop 546 extinguishes the request bus NPR signal and causes delay clear 551, after a delay equal to the width of the end cycle pulse, to enable control inhibit 506 for generation of SYSCLK pulses.

Operation of the priority sequence is essentially identical during read interval $L_1$ shown in FIG. 7 except that priority latch 544 immediately yields a true RCVENB 1 output and proceeds on in the priority sequence to RCVENB 2. Thus, it is seen that multiple reads are effected during each read interval which may vary from interval to interval. Indeed, the number of digital words transferred from RAM 12 to corresponding output lines is controllably varied in number from read interval to read interval on command of signals initiated in output modules 402 in conjunction with signals generated in control module 401 of multiplexer 16.

Controlled inhibit 506 is employed to inhibit, if necessary, generation of a SYSCLK pulse until transfer of requested digital words from word buffers in RAM 12 to corresponding ones of registers 650 in output modules 402 have been completed or until the read cycle during a read interval has been aborted. A circuit which may be employed for controlled inhibit 506 is shown in FIG. 6 of U.S. Pat. No. 3,990,050. SYSCLK pulse generation is inhibited via controlled inhibit 506 so that address counter 510 is not incremented and registers 650 are not clocked either until the requested data words have been loaded or the read cycle during the read interval has been aborted. This inhibiting of the SYSCLK pulse minimizes system errors and insures that the data words are supplied to the appropriate ones of registers 650 and thereby allows for some flexibility in the time required to supply the data words to the requesting output modules.

Delay clear 551 merely delays the true bus request NPR output from output 0 of flip-flop 546 for the interval of the end cycle (EC) pulse so that controlled inhibit 506 is not enabled until after the end cycle pulse.

An output from delay clear 551 is also supplied to one input of AND gate 542. Control signal master A (MA) is supplied to a second input of AND gate 542. The output of gate 542 is supplied to error reset one-shot 505. Output B of clock 503 is also supplied to error reset one-shot 505. Error reset one-shot 505 is employed to generate a signal for resetting flip-flop 546 when mastership of the bus has not been granted to multiplexer 16. This is evidenced by master A (MA) being a true signal during what would normally be the read cycle and the output of delay 551 being true causing AND gate 542 to yield a true output. If the output from gate 542 is true at the beginning of the next clock cycle, then error reset one-shot 505 is triggered by output B of clock 503 to yield a true pulse signal which is supplied via gate 553 to the control clear (CC) input of control interface 501 and, in turn, is inverted and supplied via NOR gate 549 to clear flip-flop 546 and enable delay clear 551 to generate a signal for enabling controlled inhibit 506. A circuit which may be employed for error reset one-shot 505 is shown in FIG. 9 of the U.S. Pat. No. 3,990,050.

The above priority read process is repeated for each read interval in the prescribed sequence of read intervals for as many output modules that require data words in the particular read intervals.

FIGS. 6A and 6B when assembled as shown in FIG. 6 show details of each of output modules 402. Accordingly, each of output modules 402 includes address sample comparator 601 which is employed to detect that word buffers in storage stages in a segment of an associated RAM storage unit are being loaded during a current one of the one-sixth second system cycle intervals and which segment, namely high or low, is being loaded. To this end, address lines $A_9$ through $A_{17}$ are supplied from bus 17 to each of output modules 402. Address lines $A_{12}$ through $A_{17}$ are supplied in one-to-one circuit relationship to one input of Exclusive OR gates 601-1 through 601-6, respectively. Second inputs of gates 601-2 through 601-6 are supplied with address signals which are predetermined by bias conditions set via switches 602 through 606, representative of the address of an associated one of storage units 201 in RAM 12 assigned to the particular one of output modules 402. The selected address signals, namely $A_{13}$ through $A_{17}$ are also supplied to first inputs of NAND gates 610 through 614, respectively, while the RCVENB signal from control module 401 is supplied to a second input of each of NAND gates 610 through 614.

Upon reception of the RCVENB signal from control module 401 gates 610 through 614 are enabled to supply the storage unit address assigned to the output module to control unit 401. A so-called buffer bit (BB) from common control 401 is supplied via inverter 607 to a second input of gate 601-1. The buffer bit represents the RAM storage unit segments, i.e., high or low, which is presently being loaded in RAM 12 with digital words from disk 11 and which is to be outputted during the next one-sixth second system cycle interval. Buffer bit (BB) is generated by address counter 510 in control module 401 as described above. Comparator 601 is operative to generate a true output, i.e., an output representative of a logical 1, when signals supplied via address lines $A_{12}$ through $A_{17}$ compare to the address signals set via switches 602 through 606 plus the buffer bit. The output from comparator 601 is supplied to one input of NAND gate 616. Comparator 601 yields a desired high output only when all of the outputs of gates 601-1 through 601-6 are true. This is achieved by employing so-called open collector type gates now well known in the art.

Bus line decoder and store 617 is employed to determine that one or more of the storage stages in the segment of the associated RAM storage unit are presently being loaded, as indicated by a true output from comparator 601 and to store signals representative of those storage stages that include word buffers that have been loaded. To this end, incoming address lines $A_9$, $A_{10}$ and $A_{11}$ are connected in one-to-one circuit relationship to predetermined inputs of decoder and store 617. The output from comparator 601 is supplied via NAND gate 616 to enable decoder and store 617. That is to say, decoder and store 617 responds to a false output from NAND gate 616 to decode the current address bits presently being supplied via address lines $A_9$, $A_{10}$ and $A_{11}$. In turn, NAND gate 616 is enabled by a master sync signal (MSYN) supplied from bus control 501 of common control 401. Generation of the MSYN signal is described in the PDP-11 Peripheral Handbook beginning in page 5-6 at paragraph 5.5. Specifically, a MSYN pulse is generated upon a transfer of digital words from the disk memory of mass storage unit 11 to word buffers in a storage stage of RAM 12. Consequently, decoder and store 617 is enabled during intervals that the output from NAND gate 616 goes further indicating that digital words are being supplied to a storage stage in the memory unit identified by comparator 601.

During each one-sixth second system cycle interval decoder and store 617 decodes incoming groups of address bits $A_9$, $A_{10}$ and $A_{11}$ and stores a signal representative of each group of the decoded addresses. If all of the storage stages, i.e., 0 throught 7 of the associated storage unit, include buffers which have been loaded, outputs S'0 through S'7 of decoder and store 617 will all be true, i.e., representative of a logical 1. If none of the buffers in the storage stages in the associated storage unit was loaded the outputs of decoder and store 617 would be false, i.e., representative of a logical 0. In any event, the storage stages in the storage unit which have loaded buffers are indicated by a true signal at the output of decoder and store 617 which corresponds to the particular storage stage. Outputs S'0 through S'7 correspond to buffer stages 0 through 7, respectively, being loaded during the current system cycle. Decoder and store 617 is cleared by a CLR address sampler signal supplied via NOR gate 620 from common control unit 401 upon termination of the system cycle interval and after the stored signals have been transferred, i.e., clocked into bus line store 621 via a clock bus line store signal also supplied from common control unit 401. It is again noted that the clock bus line store signal occurs prior to the clear address sampler signal, as discussed above, so that the outputs from decoder 617 are stored in bus line store 621 prior to decoder 716 being cleared. Any addressable latch circuit arrangement may be employed in well-known fashion for decoder and store 617. Decoder 617 and store 621 are initialized by GO being supplied via NOR gate 620 and inverter 622, respectively.

Bus line store 621 is employed to store the signals representing the storage stages in the associated storage unit which have word buffers that have been loaded during the last previous system cycle, namely $S_0$ through $S_7$ for the purpose of effecting the transfer of digital code words from the loaded buffers in those storage stages to registers 650-0 through 650-7 in sequential order during the present system cycle interval.

Outputs $S_0$ through $S_7$ of bus line store 621 are connected in one-to-one circuit relationship with first inputs of AND gates 630-0 through 630-7, respectively. Outputs $L_0$ through $L_7$ from common control unit 401 are connected in one-to-one circuit relationship with second inputs of AND gates 630-0 through 630-7, respectively. Outputs from AND gates 630-0 through 630-7 are connected in one-to-one circuit relationship with first inputs of AND gates 630-1 through 630-7, respectively, and are connected to inputs of OR gate 632. Second inputs of AND gates 631 are supplied with a data strobe (DS) signal from control interface 501 via NAND gate 633 under control of RCVENB from common control 401. The outputs from AND gates 631-0 through 631-7 are connected in one-to-one circuit relationship with the load control inputs of shift registers 650-0 through 650-7, respectively. Thus, gates 631 are each effective to load an associated one of registers 650 only when the particular output module is enabled during the read intervals by a corresponding RCVENB signal from common control 401. In this manner the output modules are controlled to load registers in more than one output module is a prescribed priority sequence during each read interval of the prescribed sequence of read intervals. SYSCLK pulse signals are supplied to shift clock inputs of registers 650 while silence code signals are supplied to the serial data inputs of registers 650. The silence code is merely a signal having alternate 1s and 0s. Generation of the silence code is realized by supplying the SYSCLK signal to toggle flip-flop 635. The alternate 1-0 output from flip-flop 635 is loaded into each of registers 650 when the data words are being shifted out and when no data words have been loaded. In practice, each of registers 650 includes two 8-bit shift registers connected in tandem.

The outputs from AND gates 630-0 through 630-7 indicate sequentially which ones of storage stages 0 through 7 of the associated storage unit in RAM 12 include word buffers that have been loaded with data words to be transferred to corresponding ones of registers 650 during the current one-sixth second system cycle interval. That is to say, the storage stages of RAM 12 which include buffers that have been loaded as indicated by outputs $S_0$ through $S_7$ of store 621 are scanned by employing gates 630 and signals $L_0$ through $L_7$ from common control 401. Consequently, AND gates 631-0 through 631-7 in each of the output modules are enabled sequentially to load the corresponding 16-bit digital word supplied in parallel via data lines $D_0$ through $D_{15}$ from bus 17 into the appropriate one of registers 650-0 through 650-7. Gates 631 are enabled by the data strobe (DS) signal at an appropriate instant under control of RCVENB from common control 401 to load the digital word from lines $D_0$ through $D_{15}$ into the appropriate one of registers 650. As discussed above, RCVENB is supplied to the output modules which are to be supplied with a digital word in a prescribed priority sequence during each read interval. See FIG. 7 for the time relationship between the data strobe signal and several others of the control signals generated during each read cycle during the read interval.

A true output from OR gate 632 indicates that a digital word is needed from the storage stage and word buffer that is identified by the address signal currently being generated by counter 510 in control 401 in the storage unit identified by the address signal generated in the output module, namely $A_{13}$ through $A_{17}$. The current address signals, namely $A_1$ through $A_{17}$, are supplied by common control unit 401 to RAM 12 at an appropriate instant, i.e., gate address (GA), to realize the transfer of that particular digital word from that particular buffer. The output from OR gate 632 is employed to initiate a so-called request for nonprocessor request (REQNPR). The REQNPR must be stored in each output module until employed in the priority sequence in common control 401 to generate a corresponding word request from RAM 12 and to generate a corresponding RCVENB signal as described above. Storage of REQNPR is achieved by setting D-type flip-flop 636. This is effected by supplying the output from OR gate 632 via NAND gate 637 to the clock input of D-type flip-flop 636. NAND gate 637 is enabled by the SYSCLK pulse and flip-flop 636 is clocked by the trailing edge of the SYSCLK pulse to yield a true signal on output 1. In turn, the true output from flip-flop 636 enables NAND gate 638 to yield a false output until flip-flop 636 is cleared. Clearing of flip-flop 636 is effected upon receiving a corresponding RCVENB signal and a clear data request (CDR) signal from common control 401. A true RCVENB signal is supplied via inverter 639 to one inhibit input of AND gate 640 while the clear data request (CDR) signal is supplied to a second inhibit input of AND gate 640. Thus, when both inputs to AND gate 640 are false gate 640 yields a true output which is inverted and supplied via NOR gate 641 to the clear input of flip-flop 636 resetting it to its initial condition of a false signal on output 1. Generation of REQNPR is iterated during each read interval in the prescribed sequence of read intervals for the storage stages in the associated storage unit having loaded buffers as determined by scanning signals $S_0$ through $S_7$ from bus line store 621 by employing signals $L_0$ through $L_7$, respectively, to sequentially enable AND gates 630-0 through 630-7 during second periodic intervals.

Figure 8:
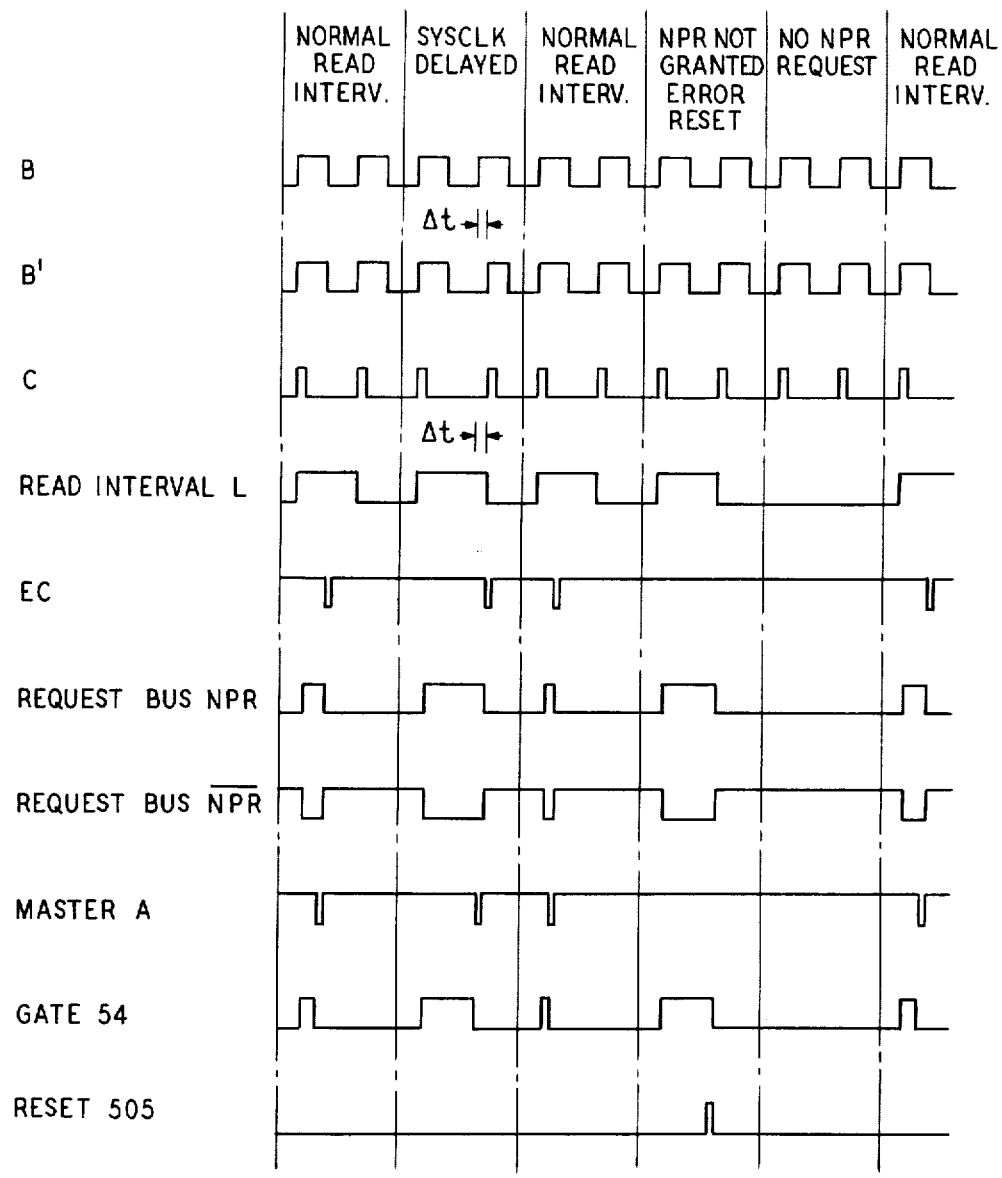
FIG. 8 shows another sequence of waveforms useful in describing operation of certain aspects of multiplexer 16.

FIG. 8 shows a sequence of waveforms of signals generated in common control 401 and output modules 402 during several possible read intervals. It is assumed for purposes of clarity that only one storage unit has requested an REQNPR during each of the read intervals. Accordingly, a normal read interval is one in which a SYSCLK pulse need not be delayed. That is to say, a REQNPR is made, granted, and done after generation of a first SYSCLK pulse and prior to generation of the next SYSCLK pulse, i.e., in one normal read interval. As shown in FIG. 8, read interval control signal L goes true in response to a first SYSCLK pulse shown in waveform C and remains true until the occurrence of the next SYSCLK pulse. Latch 544 CLK output (not shown) goes true in response to the REQNPR'N signal occurring at the trailing edge of the SYSCLK pulse and remains true until cleared by the end cycle (EC) pulse. Similarly, request bus NPR goes true (FIG. 8) in response to the CLK output from latch 544 and also remains true until cleared by the EC pulse. Request bus $\overline{NPR}$ is employed via delay clear 551 to controlled inhibit 506 so that SYSCLK pulses may be delayed. Request bus NPR signal is supplied to bus control interface 501 which communicates the REQNPR to processor 10 via bus 17 and awaits a response. Prior to the request NPR being granted, Master A is true and is supplied to AND gate 542. The output from delay 551 is also true. Therefore, the output of AND gate 542 is true. The output from AND gate 542 alone does not trigger error reset one-shot 505 for reasons to be discussed below. Thus, output 1 of flip-flop 546 remains true until an EC signal is supplied via gate 548 and NOR gate 549 to clear flip-flop 546. However, prior to generation of the EC signal a Master A signal is received as indicated by Master A going false. A Master A signal causes generation of a number of control signals in rapid succession as noted above in reference to FIG. 7 and the normal read interval has been completed.

During the next read interval it is assumed that the read cycle is not completed prior to the time when the next subsequent SYSCLK pulse would normally have been generated. Consequently, generation of the next SYSCLK pulse is delayed by an interval $\Delta T$ until the read interval is completed as indicated by the end cycle pulse. Except for the delay introduced via controlled inhibit 506, all control signals are generated in the same sequence as for the normal read interval described above.

In the next read interval it is assumed that a digital word is required and is read in a normal sequence.

In the next read interval, however, it is assumed that a data word is required but that the NPR request for some reason was not granted in a predetermined time interval. In such event, no false Master A signal is generated and the Master A input to AND gate 542 (FIG. 5) remains true. Consequently, error reset one-shot responds to the high output from AND gate 542 and the next false-to-true, i.e., 0-to-1, state transition of output B from clock 503 to generate a narrow pulse rest signal which is supplied via gate 553 and NOR gate 549 to clear flip-flop 546 and abort the read interval. Since the REQNPR was not granted no false Master A signal was generated and, consequently, no gate address, data strobe, end cycle and other control signals were generated. Since the read interval was aborted via error reset one-shot 505 no data word was transferred to the appropriate one of registers 650 corresponding to the loaded word buffer and the requesting line. That particular digital word is lost and a silence code is outputted from the particular one of registers 650 assigned to the storage stage.

During the next read interval it is assumed that the storage stage in the memory unit of RAM 12 representative by the address generated by counter 510 has not been loaded. Therefore, no REQNPR has been requested.

In the next read interval the corresponding storage stage includes buffers that have been loaded and a normal read interval is effected as indicated by the waveforms in FIG. 8.

In summary, operation of the instant telephone multiline response system is controlled via signals generated in multiplexer 16 to operate on a so-called system cycle basis. The system cycle interval may be set at any desired time interval, in this example, as indicated above, a one-sixth second cycle is being used. The choice of a one-sixth second interval is somewhat arbitrary and corresponds approximately to a speech segment. Thus, the instant system continuously cycles through first periodic intervals of one-sixth second duration in responding to random incoming requests. For example, beginning during a system cycle, processor 10 (FIG. 1) in conjunction with programs stored in RAM 12 in known fashion, determines that a request or requests have been made by one or more subscribers at one or more of station sets 23. Then, processor 10 in conjunction with specific applications programs, not relevant to the instant invention, determines which message segments stored in the disk memory of mass storage unit 11 are required to concatenate the response or responses. That is to say, in the current system cycle, processor 10 in conjunction with programs in RAM 12 determines what responses are to be made. During the next subsequent one-sixth second system cycle processor 10 instructs the disk memory to read blocks of 256 data words each, representative of desired message segments to word buffers in storage stages in storage units corresponding to the requesting lines. The RAM storage stages are arranged sequentially and are located in designated storage units. The disk memory assumes mastership of bus 17 and transfers the desired data words to word buffers in the dedicated storage stages in the RAM storage units. To effect this transfer, the address of the RAM storage stage and storage unit accompanies each data word being transferred. Each output module of multiplexer 16 monitors address lines for the RAM storage unit and RAM storage stage addresses assigned thereto and registers when the disk has loaded data words into the assigned storage stages in the storage unit. Thus, the output modules in multiplexer 16 register that data words are to be read from the storage stages in the assigned storage units of RAM 12 during the next system cycle interval. At the end of the system cycle interval, multiplexer 16 generates an interrupt (IR) signal which notifies processor 10 that the system cycle has been completed. Multiplexer 16 then generates control signals to unload in a prescribed priority sequence during each read interval in a prescribed sequence of read intervals during second periodic intervals the 16-bit data words in parallel from the loaded word buffers in storage stages in storage units into appropriate ones of registers 650 of the corresponding output modules 402. The data words are then supplied in serial form to corresponding ones of decoders 20 assigned to the requesting lines. This process is repeated until the 256 digital words in the word buffers of each loaded storage stage in each storage unit have been outputted and the one-sixth second system cycle interval has terminated. While multiplexer 16 was causing the word buffers to be read from the storage stages in the first segment of each of the storage units, processor 10 had instructed the disk memory to load the next blocks of 256 data words each to be outputted into word buffers in storage stages located in a second segment of each storage unit for output during the next system cycle. The storage stages to be loaded may correspond to the previous requesting lines or any additional requesting lines. Multiplexer 16 continuously monitors the addresses on the address lines to detect which storage stages have been loaded in the assigned storage units and effects reading the digital words from the loaded word buffers in the storage stages as described above. During intervals representative of pauses in the speech process or no signal to be outputted, multiplexer 16 generates a silence code which is supplied to decoders 20. The above process is iterated on the one-sixth second system cycle interval until all messages to all requesting lines have been completed. Then, multiplexer 16 reverts to an idle state in which it continuously cycles through the RAM buffer addresses to generate system timing and continuously supplies a silence code to all of decoders 20.

It is felt important again to note the multiple word transfer pattern generated by multiplexer 16. Consider an example in which requests have been made for lines 0, 1 and 5 assigned to output module 402-0; for lines 0, 1, 5 and 7 assigned to output module 402-1; for lines 3 and 5 assigned to output module 402-2; and for lines 1, 5 and 7 assigned to output module 402-3. Table III shows these requests (R) and no request as silence (S).

TABLE III

| Output Module | Read Interval | | | | | | | |
|---|---|---|---|---|---|---|---|---|
| | $L_0$ | $L_1$ | $L_2$ | $L_3$ | $L_4$ | $L_5$ | $L_6$ | $L_7$ |
| 402-0 | R | R | S | S | S | R | S | S |
| 402-1 | R | R | S | S | S | R | S | R |
| 402-2 | S | S | S | R | S | R | S | S |
| 402-3 | R | S | S | S | S | R | S | R |

Thus, it is seen from Table III that in read interval $L_0$ assigned to storage stage 0 in each of the storage units assigned to modules 402, the corresponding digital words are read out in the above-described priority sequence to modules 402-0, 402-1, and 402-3 in that order during read interval $L_0$ of the prescribed sequence of read intervals. In read interval $L_1$ assigned to storage stage 1 in each of the storage units digital words are read in the prescribed priority sequence to modules 402-0 and 402-1 in that order. In read interval $L_2$ no words are read. In read interval $L_3$ a single digital word is read from storage stage 3 in the storage unit assigned to output module 402-2. In interval $L_4$ no words are read. In interval $L_5$ digital words are read from storage stage 5 in each of the output modules to output modules 402-0, 402-1, 402-2 and 402-3 in that order during the read interval. In read interval $L_6$ no digital words are read. In read interval $L_7$ assigned to storage stage 7 in each storage unit digital words are read to modules 402-1 and 402-3 in that order. A silence signal is supplied during intervals that no word or words are being read. This read interval process is iterated until all 256 word buffers in each of the loaded storage stages in each of the storage units have been read during the current system cycle interval. During the next system cycle interval the same lines may be active, additional lines may become active or some of the previous lines may have become inactive. In any event, multiplexer 16 will effect reading of digital words from RAM 12 corresponding to those lines which it has detected that storage stages have been loaded during the previous system cycle interval. Thereafter, the multiple word read process, which may vary in number from read interval to read interval, is iterated as described above.

What is claimed is:

1. In a multiline telephone inquiry voice answer system of the type including output apparatus for monitoring address lines in a computer system to detect when digital words to be outputted have been loaded from a mass storage unit into word buffers in storage stages of a memory unit separate from the mass storage unit and then generating control signals to initiate and effect reading of those digital words in a prescribed output sequence of read intervals, wherein the improvement comprises:

a plurality of output modules each adapted to supply digital words to a predetermined number of output lines and being assigned on a one-to-one basis with a plurality of storage units in said memory unit, each of said output modules including means responsive to prescribed address signals transmitted on said computer system address lines when transferring digital words from the mass storage unit to word buffers in stages of a storage unit of said memory unit assigned to the output module for generating digital word read initiation signals corresponding to storage stages in said storage unit having loaded word buffers to be outputted in each read interval of said prescribed sequence of read intervals;

means responsive to said digital word initiation signals supplied from said plurality of output modules during each of said read intervals for normally generating a prescribed sequence of read control signals in response to each of said read initiation signals for effecting reading in a prescribed priority sequence digital words from word buffers in storage stages of said storage units corresponding to said output modules generating read initiation signals in each of said read intervals; and means in each of said output modules responsive to predetermined ones of said control signals in a corresponding sequence generated to effect reading of a digital word from a word buffer in a storage stage of a storage unit assigned to the output module in said priority sequence for enabling the corresponding output module to receive the corresponding digital word, wherein a number of digital words are read in said priority sequence during each read interval in said prescribed sequence of read intervals corresponding to the number of output modules generating said read initiation signals which number is variable from read interval to read interval dependent on the number of output modules that have generated read initiation signals.

2. A system as defined in claim 1 wherein each of said output modules further includes means for generating predetermined address signals corresponding to a storage unit in said memory unit assigned to the particular output module, and means for controllably outputting said address signals in response to a predetermined one of said output module receive enabling control signals, each of said storage units including a number of storage stages sequentially arranged and assigned on a one-to-one basis to a corresponding number of output lines and each of said storage stages having a plurality of word buffers.

3. A system as defined in claim 2 wherein said control signal generating means further includes means for controllably supplying in said priority sequence to said computer system address signals supplied by said output modules and address signals representative of the storage stages assigned to the individual read intervals and the word buffer to be read during each read interval in said prescribed sequence of read intervals, wherein said storage stage and word buffer address signals are generated during repetitive first periodic intervals.

4. A system as defined in claim 3 wherein each of said output modules further includes read storage means for storing a read initiation signal during each read interval and means responsive to a predetermined one of said read sequence control signals and a predetermined one of said receive enable control signals for clearing said read storage means to initialize said read storage means for storing a read initiation signal generated in a subsequent read interval.

5. A system as defined in claim 4 wherein said plurality of output modules are ordered from a most significant output module to a least significant output module and wherein said control signal generating means includes means responsive to said read initiation signals from said output modules for generating signals to initiate a number of read control signal sequences in said prescribed priority sequence equal to the number of output modules generating read initiation signals beginning with the most significant one of said output modules generating a read initiation signal during the read interval.

6. A system as defined in claim 5 wherein said control signal generating means further includes controllable means responsive to said read initiation signals and to a particular one of said read control signals in each sequence for generating said receive enable signals in said priority sequence and means responsive to a predetermined output from said controllable means for generating a computer read request signal during each of said read intervals that at least one output module has generated a read initiation signal.

7. A system as defined in claim 6 wherein said controllable means includes priority latching means for generating said receive enable signals and logic gate means, said logic gate means being cooperatively responsive to a predetermined one of said read control signals in each of said sequences of control signals, and a predetermined output from said read request signal generating means for updating said latching means to generate the next most significant receive enable signal at the termination of each of said sequences of read control signals during each read interval.

8. A system as defined in claim 7 wherein said control signal generating means includes means responsive to resetting of the read initiation signal storage means in the least significant one of said output modules having had generated a read initiation signal in said read interval and to a predetermined one of said read control signals for re-initializing said control signal generating means for the next subsequent read interval in said prescribed sequence of said read intervals.

9. Output apparatus for initiating and effecting reading digital words from word buffers in a number of storage stages in a plurality of storage units in a memory unit of a computer system to a corresponding plurality of output lines in a prescribed sequence of read intervals of the type including an arrangement to monitor address signals transmitted on address lines in the computer system to detect the particular storage stages which include word buffers that have been loaded with digital words to be outputted and then generating control signals to effect reading of the digital words to the corresponding output lines in the prescribed sequence of read intervals, wherein the improvement comprises:

a plurality of output modules assigned on a one-to-one basis with said plurality of storage units and each adapted to supply digital words from word buffers in storage stages in said assigned storage unit to a number of output lines corresponding to the number of storage stages in the assigned storage unit, each of said output modules including means responsive to prescribed address signals transmitted on said computer system address lines when transferring digital words from a mass storage unit to word buffers in stages of a storage unit assigned to the output module for generating digital word read initiation signals corresponding to the storage stages having loaded word buffers to be outputted in each read interval of said prescribed sequence of read intervals, and control signal generating means responsive to said read initiation signals from said output modules for normally generating a prescribed sequence of read control signals in response to each of said read initiation signals for effecting reading in a prescribed priority sequence digital words from word buffers in storage stages of said storage units corresponding to said output modules generating read initiation signals in each of said read intervals, wherein a number of digital words are read in said priority sequence in each read interval corresponding to the number of output modules generating read initiation signals which number is variable from read interval to read interval.

10. Apparatus as defined in claim 9 wherein said output modules are ordered from a most significant output module to a least significant output module and said control signal generating means includes means responsive to said read initiation signals for initiating generation of a number of sequences of said read control signals in said priority sequence beginning with the read initiation signal from the most significant one of said output modules during the read interval.

11. Apparatus as defined in claim 10 wherein each of said output modules further includes means responsive to a predetermined one of said control signals for enabling the corresponding output module to receive the corresponding digital word to be outputted in said priority sequence.

12. Apparatus as defined in claim 11 wherein each of said output modules further includes means for generating predetermined address signals corresponding to a storage unit in said memory unit assigned to the particular output module and means for controllably outputting said address signals in response to a predetermined one of said output module receive enable control signals.

13. Apparatus as defined in claim 12 wherein said control signal generating means further includes means for controllably supplying in said priority sequence to said computer system address signals supplied by said output modules and address signals representative of the storage stages assigned to the individual read intervals and the word buffer to be read during each read interval in said prescribed sequence of read intervals, wherein said storage stage and word buffer address signals are generated during repetitive first periodic intervals.

14. Apparatus as defined in claim 13 wherein each of said output modules further includes read storage means for storing a read initiation signal during each read interval and means responsive to a predetermined one of said read sequence control signals and a predetermined one of said receive enable control signals for clearing said read storage means to initialize said read storage means for storing a read initiation signal generated in a subsequent read interval.

15. Apparatus as defined in claim 14 wherein said control signal generating means further includes controllable means responsive to said read initiation signals and to a particular one of said read control signals in each sequence for generating said receive enable signals in said priority sequence and means responsive to a predetermined output from said controllable means for generating a computer read request signal during each of said read intervals in which one or more read initiation signals have been generated.

16. Apparatus as defined in claim 15 wherein said controllable means includes priority latching means for generating said receive enable signals and logic gate means, said logic gate means being cooperatively responsive to a predetermined one of said read control signals in each of said sequences of control signals and a predetermined output from said read request signal generating means for updating said latching means to generate the next most significant receive enable signal at the termination of each of said sequences of read control signals during each read interval.

17. Apparatus as defined in claim 16 wherein said control signal generating means includes means responsive to resetting of the read initiation signal storage means in the least significant one of said output modules having had generated a read initiation signal in said read interval and to a predetermined one of said read control signals for re-initializing said control signal generating means for the next subsequent read interval in said prescribed sequence of said read intervals.

* * * * *